US012613066B2

(12) United States Patent
Moon et al.

(10) Patent No.: US 12,613,066 B2
(45) Date of Patent: Apr. 28, 2026

(54) EQUIPMENT AND METHOD FOR DRYING ELECTRODE SUBSTRATE COMPRISING SCREEN FOR FLOW VOLUME DISTRIBUTION

(71) Applicant: LG Energy Solution, Ltd., Seoul (KR)

(72) Inventors: Young Gyu Moon, Daejeon (KR); Kyoung Ho Kim, Daejeon (KR); Dong Hyun Kim, Daejeon (KR); Young Geun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 569 days.

(21) Appl. No.: 17/914,247

(22) PCT Filed: Oct. 27, 2021

(86) PCT No.: PCT/KR2021/015235
§ 371 (c)(1),
(2) Date: Sep. 23, 2022

(87) PCT Pub. No.: WO2022/108162
PCT Pub. Date: May 27, 2022

(65) Prior Publication Data
US 2023/0113439 A1 Apr. 13, 2023

(30) Foreign Application Priority Data
Nov. 18, 2020 (KR) ......................... 10-2020-0154531

(51) Int. Cl.
*F26B 3/04* (2006.01)
*F27B 9/30* (2006.01)
(Continued)

(52) U.S. Cl.
CPC .............. *F26B 3/04* (2013.01); *F27B 9/3011* (2013.01); *F27B 9/40* (2013.01); *F27D 21/0014* (2013.01);
(Continued)

(58) Field of Classification Search
CPC ........ F26B 3/04; F26B 13/002; F26B 13/007; F26B 13/108; F26B 21/004; F26B 21/12;
(Continued)

(56) References Cited

U.S. PATENT DOCUMENTS 3,529,357 A     9/1970  Hune et al.
3,895,449 A  *  7/1975  Chance .................... D21F 5/18
239/560
(Continued)

FOREIGN PATENT DOCUMENTS

CN        107218795 A      9/2017
JP        H11329416 A     11/1999
(Continued)

OTHER PUBLICATIONS

International Search Report for Application No. PCT/KR2021/015235 mailed Jan. 28, 2022, 2 pages.
(Continued)

*Primary Examiner* — David J Laux
(74) *Attorney, Agent, or Firm* — Lerner David LLP

(57) ABSTRACT

The present technology relates to an equipment and method for drying an electrode substrate including a screen for distributing the flow of hot air, and according to the present technology, it is possible to uniformly dry the electrode substrate in the width direction. The equipment includes a drying furnace configured to dry the electrode substrate, a hot air discharge unit including a nozzle configured to discharge hot air; and a screen positioned on a hot air discharge line of the hot air discharge unit configured to control the hot air discharged from the nozzle.

17 Claims, 7 Drawing Sheets

300

(C-7) (C-6) (C-5) (C-4) (C-3) (C-2) (C-1)

(51) Int. Cl.
    *F27B 9/40*         (2006.01)
    *F27D 21/00*        (2006.01)
    *H01M 10/04*      (2006.01)
(52) U.S. Cl.
    CPC . *H01M 10/0404* (2013.01); *F27B 2009/3088*
                             (2013.01)
(58) Field of Classification Search
    CPC .................... F26B 21/06; F27B 9/3011; F27B
                       2009/3088; B05D 3/0413
    See application file for complete search history.

(56)           References Cited

U.S. PATENT DOCUMENTS

| | | | |
|---|---|---|---|
| 2004/0043156 A1* | 3/2004 | Emch ........................ | B05D 7/52 |
| | | | 427/407.1 |
| 2004/0181967 A1 | 9/2004 | Fujinami et al. | |
| 2007/0125876 A1* | 6/2007 | Bolling ................. | F26B 21/004 |
| | | | 34/640 |
| 2015/0255780 A1 | 9/2015 | Tsuchiya | |
| 2017/0276429 A1* | 9/2017 | Heo ........................ | F26B 21/14 |
| 2022/0263058 A1 | 8/2022 | Woo et al. | |

FOREIGN PATENT DOCUMENTS

| | | | |
|---|---|---|---|
| JP | 2004268392 A | 9/2004 | |
| JP | 2005030657 A | 2/2005 | |
| JP | 2008103098 A | 5/2008 | |
| JP | 2009133525 A | 6/2009 | |
| JP | 2012097917 A | 5/2012 | |
| JP | 2012172960 A | 9/2012 | |
| JP | 2012202600 A | 10/2012 | |
| JP | 2012225642 A | 11/2012 | |
| JP | 2015011964 A | 1/2015 | |
| JP | 2015172450 A | 10/2015 | |
| JP | 5954599 B2 | 7/2016 | |
| JP | 2019163903 A | 9/2019 | |
| KR | 20130083919 A | 7/2013 | |
| KR | 20150058351 A | 5/2015 | |
| KR | 20160037672 A | 4/2016 | |
| KR | 20170094913 A | 8/2017 | |
| KR | 20170109912 A | 10/2017 | |
| KR | 2018-0086596 | * 8/2018 | |
| KR | 20180086596 A | 8/2018 | |
| KR | 20200012329 A | 2/2020 | |
| KR | 20200058315 A | 5/2020 | |

OTHER PUBLICATIONS

Corrected European Search for Application No. 21894933.7 mailed Sep. 25, 23. 8 pgs.

* cited by examiner

【FIG. 1】
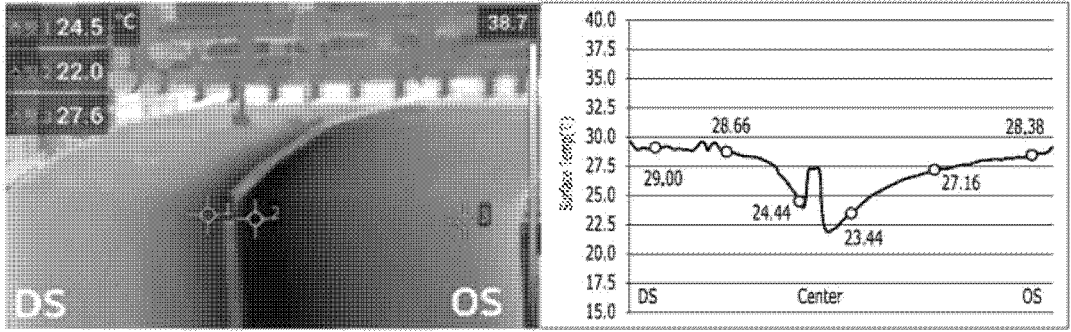

【FIG. 2】
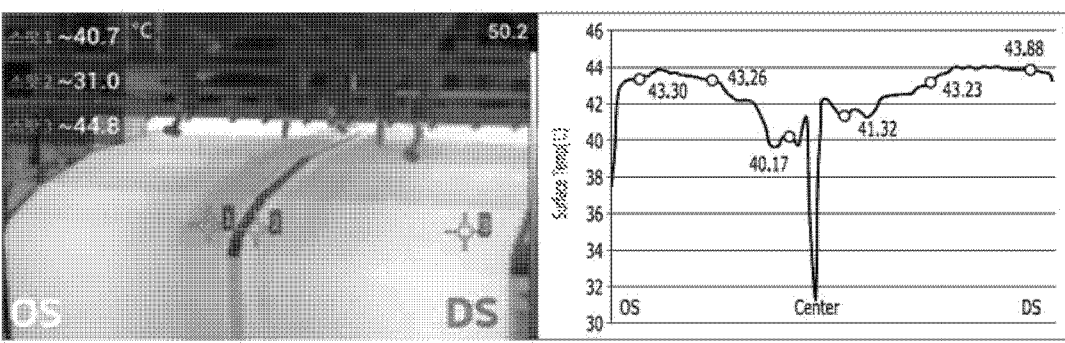

【FIG. 3】
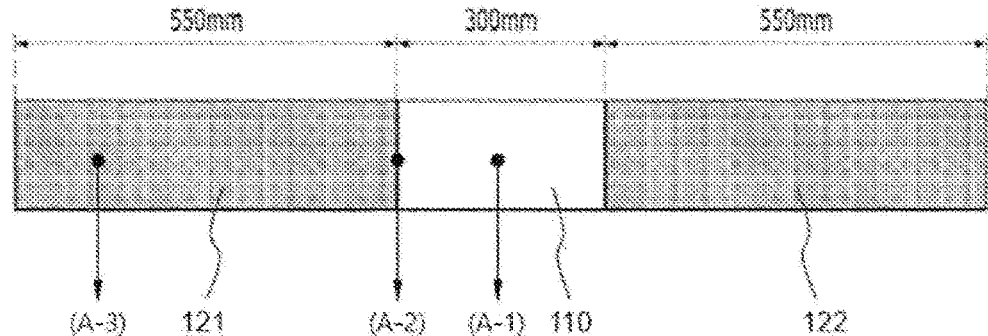

【FIG. 4】
200
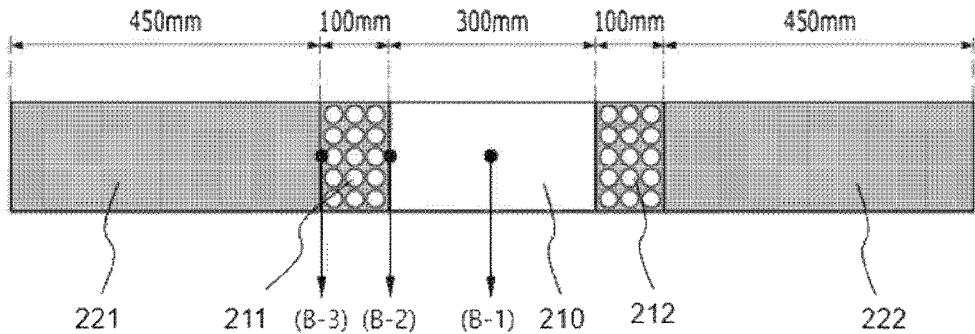

【FIG. 5】
300
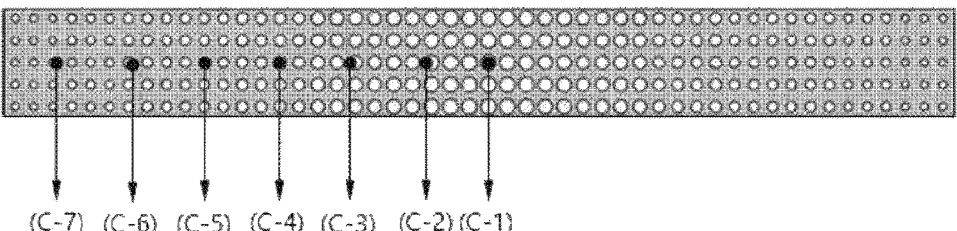
(C-7)   (C-6)   (C-5)   (C-4)   (C-3)   (C-2) (C-1)

【FIG. 6】
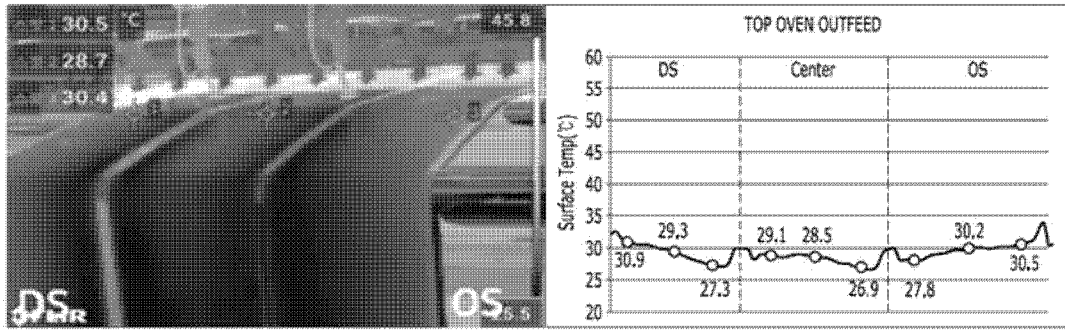

【FIG. 7】
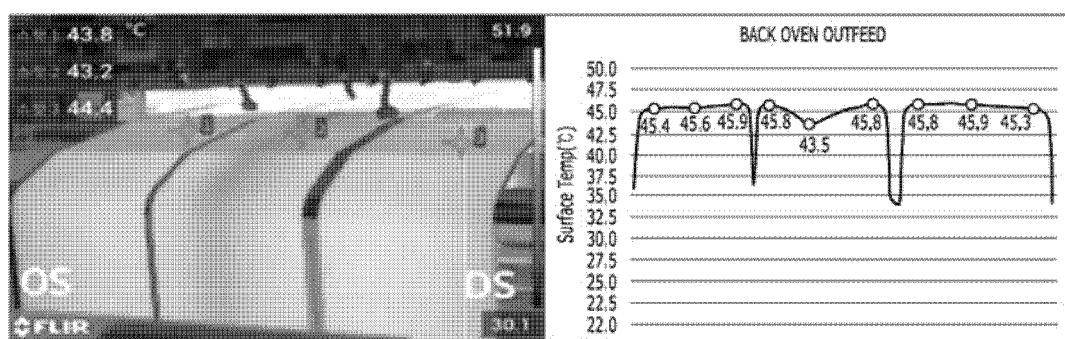

EQUIPMENT AND METHOD FOR DRYING ELECTRODE SUBSTRATE COMPRISING SCREEN FOR FLOW VOLUME DISTRIBUTION

CROSS-REFERENCE TO RELATED APPLICATIONS

This application is a national phase entry under 35 U.S.C. § 371 of International Application No. PCT/KR2021/015235, filed on Oct. 27, 2021, which claims priority from Korean Patent Application No. 10-2020-0154531, filed on Nov. 18, 2020, and the entire contents of the Korean patent application are incorporated herein by reference.

TECHNICAL FIELD

The present invention relates to an equipment and a method for drying an electrode substrate including a screen for distributing the flow of hot air.

BACKGROUND ART

Recently, as technology development and demand for mobile devices increase, the demand for secondary batteries as energy sources is rapidly increasing.

A secondary battery may be used in the form of a single battery cell or a module, in which a plurality of unit batteries are electrically connected, depending on the type of an external device. For example, a small device such as a mobile phone can be operated for a predetermined time with one battery cell output and capacity, but medium and large devices such as a notebook computer, a portable DVD, a personal computer, an electric vehicle, and a hybrid electric vehicle need a battery module including a plurality of battery cells due to the output and capacity requirements.

Further, a secondary battery is manufactured through a process of assembling a battery cell and a process of activating the battery. At this time the activation process of the battery is performed as a charge/discharge device applies a necessary electric current to the target battery cell.

FIGS. 1 and 2 show profiles obtained by measuring the surface temperature of an electrode substrate right after drying the electrode substrate after top-coating and back-coating the electrode substrate when a conventional electrode substrate drying method is implemented.

Referring to FIG. 1, after forming a mixture layer on one surface of an electrode substrate, the surface temperature of the electrode substrate was measured in the transverse direction (TD) at the point of time after performing the drying process in a conventional scheme. In FIG. 1, the temperature of the center part of the electrode substrate is about 24° C. In this regard, the temperature of two side parts (DS and OS) is about 28° C. In the electrode substrate of FIG. 1, the temperature difference between the center part and the side part is about 4° C.

Further, referring to FIG. 2, after forming a mixture layer on one surface of an electrode substrate, drying the electrode substrate and then performing a back-coating process of forming a mixture layer on the other surface of the electrode substrate, the surface temperature of the electrode substrate was measured in the transverse direction (TD) after performing the drying process in a conventional scheme. In FIG. 2, the temperature of the center part of the electrode substrate is about 40.7° C. In this regard, the temperature of two side parts (DS and OS) is about 43.3° C. In the electrode substrate of FIG. 2, the temperature difference between the center part and the side portion is about 3° C.

As shown in FIGS. 1 and 2, when drying an electrode substrate according to a conventional scheme, a temperature difference between 2 to 6° C. is shown in the width direction of the electrode substrate. Such a temperature difference decreases the adhesive force between the electrode substrate and the mixture layer and causes a crack on the surface of the electrode due to the excessive drying of the side part of the electrode substrate.

Therefore, there is a need for a technology for uniformly drying an electrode substrate without excessively changing the conventional equipment.

DISCLOSURE

Technical Problem

The present invention is believed to solve at least some of the above problems. For example, an aspect of the present invention provides an apparatus and method for drying an electrode substrate including a screen for distributing the flow of hot air.

Technical Solution

The present invention provides equipment for drying an electrode substrate. In one example, equipment for drying an electrode substrate according to the present invention includes: a drying furnace which dries an electrode substrate transferred along a transfer line; a hot air discharge unit which discharges hot air through a nozzle positioned on an upper portion of the drying furnace; and a screen which is positioned on a hot air discharge line of the hot air discharge unit and controls hot air discharged from the nozzle. Further, the screen is divided into a center part and a side part on a basis of a length in a width direction of the electrode substrate and satisfies following condition 1.

$$D_{center} > 1.3 \times D_{side},\qquad\text{[Condition 1]}$$

Herein, $D_{center}$ denotes an average opening ratio in a center part region on a basis of the length in the width direction of the electrode substrate, and $D_{side}$ denotes an average opening ratio of side parts formed on both side surfaces of the center part.

In one example, in the equipment for drying an electrode substrate according to the present invention, a formation ratio (C:S) of the center part C to side parts S, which are formed on both side surfaces of the center part and have a closed structure, is in a range of 15 to 60:40 to 85.

In another example, in the equipment for drying an electrode substrate according to the present invention, a wind speed of the hot air applied to each region of the electrode substrate corresponding to the screen satisfies following condition 2.

$$1.5 \le (WS_{center})/(WS_{side}) \le 10\qquad\text{[Condition 2]}$$

Herein, $WS_{center}$ denotes a wind speed (m/s) of hot air applied to the electrode substrate corresponding to the center part region of the screen, and $WS_{side}$ denotes an average wind speed (m/s) applied to the electrode substrate corresponding to a side part region of the screen.

In one example, the center part has an open structure, and the side part has a closed structure.

In another example, the center part includes an open region and boundary regions which are formed on both sides of the open region and have a plurality of through holes, and the side part has a closed structure.

In another example, each of the center part and the side part has a plurality of through holes, and each through hole formed in the center part and the side part satisfies following condition 3.

$$4 \leq D1/D2 \leq 20 \qquad \text{[Condition 3]}$$

Herein, D1 denotes an average diameter of through holes formed in the center part, and D2 denotes an average diameter of through holes formed on the side part.

In a specific example, an average diameter D1 of the through holes formed in the center part is in a range of 9 to 20 mm.

In a specific example, the diameter of the through holes continuously or sequentially decreases in a direction toward the side part from the center part.

In one example, in the equipment for drying an electrode substrate according to the present invention, an average opening ratio ($D_{center}$) of the center part is equal to or greater than 35%.

In one example, the hot air discharge unit includes: an inlet through which hot air is supplied; and a blowing fan which blows hot air supplied through the inlet.

In another example, the equipment for drying an electrode substrate according to the present invention further includes a temperature sensor which measures a surface temperature of a target electrode substrate.

Further, the present invention provides a method for drying an electrode substrate using the above-described equipment for drying an electrode substrate. In one example, the method for drying an electrode substrate according to the present invention includes: drying an electrode substrate, which is transferred along a transfer line, by using the above-described equipment.

In a specific example, during the drying of the electrode substrate, the electrode substrate has a structure where a mixture layer is coated on one surface of a current collector, and hot air is applied to a mixture-layer-coated surface of the current collector, or the electrode substrate has a structure where a mixture layer is coated on both surfaces of the current collector, and hot air is applied to a mixture-layer-coated surface of the current collector.

In a specific example, the electrode substrate is an electrode substrate for a pouch-type secondary battery.

Advantageous Effects

According to the equipment and method for drying an electrode substrate according to the present invention, it is possible to uniformly dry an electrode substrate in a width direction.

BRIEF DESCRIPTION OF THE DRAWINGS

FIG. 1 shows a profile obtained by measuring the surface temperature of an electrode substrate right after drying the electrode substrate after top-coating the electrode substrate when a conventional electrode substrate drying method is applied.

FIG. 2 shows a profile obtained by measuring the surface temperature of an electrode substrate right after drying the electrode substrate after back-coating the electrode substrate when a conventional electrode substrate drying method is applied.

FIGS. 3-5 are schematic diagrams illustrating a screen according to embodiment of the present invention, respectively.

FIG. 6 is a profile obtained by measuring the surface temperature of an electrode substrate right after drying the electrode substrate after top-coating the electrode substrate when the electrode substrate drying method according to one embodiment of the present invention is applied.

FIG. 7 is a profile obtained by measuring the surface temperature of an electrode substrate right after drying the electrode substrate after back-coating the electrode substrate when the electrode substrate drying method according to one embodiment of the present invention is applied.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the other portion but also the case where another portion is interposed therebetween. On the other hand, when a portion such as a layer, a film, an area, a plate, etc. is referred to as being "under" another portion, this includes not only the case where the portion is "directly under" the other portion but also the case where another portion is interposed therebetween. In addition, to be disposed "on" in the present application may include the case disposed at the bottom as well as the top.

The present invention relates to equipment for drying an electrode substrate to which a screen for distributing the flow of hot air has been applied. In one example, equipment for drying an electrode substrate according to the present invention includes: a drying furnace which dries an electrode substrate transferred along a transfer line; a hot air discharge unit which discharges hot air through a nozzle positioned on an upper portion of the drying furnace; and a screen which is positioned on a hot air discharge line of the hot air discharge unit and controls hot air discharged from the nozzle. Further, the screen is divided into a center part and a side part on a basis of a length in a width direction of the electrode substrate and satisfies following condition 1.

$$D_{center} > 1.3 \times D_{side}, \qquad \text{[Condition 1]}$$

Herein, $D_{center}$ denotes an average opening ratio in a center part region on a basis of the length in the width direction of the electrode substrate, and $D_{side}$ denotes an average opening ratio of side parts formed on both side surfaces of the center part.

In the screen according to the present invention, the center part has a relatively open structure, and the side part has a relatively closed structure. The flow of the hot air reaching the target electrode substrate is controlled by positioning the screen on the hot air discharge line of the hot air discharge unit. Generally, the side part is more quickly dried by the flow of the hot air during the process of drying an electrode substrate using a drying furnace. As such, the dried degrees of the center part and the side part of the electrode substrate become different, which decreases the adhesive force between the current collector and the mixture layer and causes a crack on the surface of the electrode substrate due to the excessive drying of the side part. In the present invention, the hot air is controlled to be concentrated on the center part of the electrode substrate by applying the above-described screen. Through this, the entire region of the electrode substrate can be induced to be dried at a uniform speed by applying the equipment for drying an electrode substrate according to the present invention.

The screen according to the present invention is positioned on the hot air discharge line of the hot air discharge unit and is arranged in the transverse direction (TD) of the target electrode substrate. The screen is divided into a center part and two side parts. In one embodiment, a formation ratio (C:S) of the center part C to side parts S, which are formed on both side surfaces of the center part and have a closed structure, is in a range of 15 to 60:40 to 85. Specifically, the formation ratio (C:S) is in a range of 15 to 55:45 to 85, 20 to 50:50 to 80, or 20 to 40:60 to 80. The formation ratio is determined in consideration of the uniform drying of the electrode substrate through hot air distribution. If the formation ratio of the side part is excessive, the drying efficiency of the electrode substrate decreases, and if the formation ratio of the center part is excessive, the flow distribution effect according to the screen formation decreases.

The formation ratio of the side part indicates the sum of formation regions of side parts formed at two sides on the basis of the center part. Further, the formation ratio is calculated based on the length of each formed region. For example, the total length (TD direction) of the screen is 1400 mm, the length of the center part is 300 or 500 mm, and side parts at two sides of the center part have the same length.

In one example, in the equipment for drying an electrode substrate according to the present invention, a wind speed of the hot air applied to each region of the electrode substrate corresponding to the screen satisfies following condition 2.

$$1.5 \leq (WS_{center})/(WS_{side}) \leq 10 \qquad \text{[Condition 2]}$$

Herein, $WS_{center}$ denotes a wind speed (m/s) of hot air applied to the electrode substrate corresponding to the center part region of the screen, and $WS_{side}$ denotes an average wind speed (m/s) applied to the electrode substrate corresponding to a side part region of the screen.

In the present invention, by applying the above-described screen, the wind speed ($WS_{center}$) of the hot air applied to the center part of the electrode substrate is controlled to become 1.5 to 10 times the wind speed ($WS_{side}$) of the hot air applied to the side parts of the electrode substrate. Specifically, the ratio of the wind speed defined in the above condition 2 is in the range of 1.5 to 8, 1.5 to 4, 3 to 8, 2 to 6 or 1.8 to 5.7. For example, when hot air is discharged at a condition of 1,000 rpm, the wind speed ($WS_{center}$) of the hot air applied to the center part of the electrode substrate may be 0.94 m/s, and the wind speed ($WS_{side}$) of the hot air applied to the side parts of the electrode substrate may be controlled to be about 0.20 m/s.

In one example, the center part of the screen has an open structure, and the side part of the screen has a closed structure. Through this, the supplied hot air is induced to be supplied to the electrode substrate via the opened center part.

In another embodiment, the screen includes a center part and side parts. The center part includes an open region and boundary regions which are formed at two sides of the open region and have a plurality of through holes. The side part has a closed structure. Herein, the center part has an open structure, and a plurality of through holes are formed in the boundary between the center part and the side part. For example, the boundary has a plurality of holes having an average diameter of 5 to 15 mm.

In another example, each of the center part and the side part of the screen has a plurality of through holes, and each through hole formed in the center part and the side part satisfies following condition 3.

$$4 \leq D1/D2 \leq 20 \qquad \text{[Condition 3]}$$

Herein, D1 denotes an average diameter of through holes formed in the center part, and D2 denotes an average diameter of through holes formed on the side part.

The screen has through holes on the front surface. The diameter of each of the through holes at the center part is relatively large, and the diameter of each of the through holes at the side part is relatively small. In a specific example, an average diameter D1 of the through holes formed in the center part is in a range of 9 to 20 mm. For example, the average diameter of the through holes at the center part is in the range of 9 to 20 mm, 9 to 15 mm, or 10 to 12 mm, the average diameter of the through holes at the side part is in the range of 4 to 11 mm, 5 to 10.5 mm or 6 to 10 mm.

In another specific example, the diameter of the through holes of the screen continuously or sequentially decreases in a direction toward the side part from the center part. Through this, a large amount of hot air is induced to be flown to the center part via the screen, and a relatively small amount of hot air is induced to be flown to the side part. Further, it is possible to prevent a rapid change in the flow volume between the center part and the side part according to the formation of the screen.

In one example, in the equipment for drying an electrode substrate according to the present invention, an average opening ratio ($D_{center}$) of the center part is equal to or greater than 35%. Specifically, the average opening ratio ($D_{center}$) of the center part is in the range of 35 to 100%, 50 to 99% or 50 to 75%. When the average opening ratio of the center part is 100%, it indicates that the center part is completely opened. Further, the average opening ratio ($D_{side}$) of the side part is controlled to be lower than the average opening ratio ($D_{center}$) of the center part by more than 10%. Specifically, the average opening ratio ($D_{side}$) of the side part is equal to or less than 70%, equal to or less than 50%, in the range of 5 to 70%, or in the range of 15 to 50%. When the average opening ratio of the side part is 0%, it indicates that the side part has been completely closed.

In one example, the hot air discharge unit includes: an inlet through which hot air is supplied; and a blowing fan which blows hot air supplied through the inlet. The hot air, which is heated at the external side, is supplied through an inlet, and the supplied hot air is supplied or blown to the electrode substrate side by a blowing fan.

In another example, the equipment for drying an electrode substrate according to the present invention further includes a temperature sensor which measures a surface temperature of a target electrode substrate. The temperature sensor is used to inspect a dried state of the electrode substrate and the temperature uniformity for each region of the electrode substrate. A contact sensor may be used as the temperature sensor, but a non-contact sensor is preferred in consideration of the process efficiency, etc. For example, the temperature sensor may include a processing unit which calculates the surface temperature of the electrode substrate from a thermal imaging camera and/or images taken by the thermal imaging camera.

Further, the present invention provides a method for drying an electrode substrate using the above-described equipment for dying an electrode substrate. In one example, the method for drying an electrode substrate according to the present invention includes: drying an electrode substrate, which is transferred along a transfer line, by using the above-described equipment.

In one embodiment, in the process of drying the electrode substrate, the electrode substrate has a structure where a mixture layer is coated on one surface of a current collector, that is, a top-coated structure, and the drying is performed by applying hot air onto the mixture-layer-coated surface of the current collector. Alternatively, the electrode substrate has a structure where the mixture layer is coated on both surfaces of the current collector, that is, a back-coated structure, and the drying is later performed by applying hot air onto the mixture-layer-coated surface. For example, in the case that the electrode substrate has a back-coated structure, it may be the case that an electrode slurry has been discharged to the other surface of the current collector, which had gone through the top-coating and drying processes, to form a coating layer.

In a specific example, the electrode substrate is an electrode substrate for a pouch-type secondary battery. For example, the pouch-type secondary battery is a lithium secondary battery. Further, the electrode substrate may be a positive electrode substrate or a negative electrode substrate.

DETAILED DESCRIPTION OF THE PREFERRED EMBODIMENTS

Hereinafter, the present invention will be described in more detail through drawings and the like. However, the embodiments described in the specification and the configurations described in the drawings are only the most preferred embodiments of the present invention, and do not represent all of the technical ideas of the present invention. It is to be understood that there may be various equivalents and variations in place of them.

First Embodiment

FIG. 3 is a schematic diagram showing a screen according to one embodiment of the present invention. Referring to FIG. 3, the screen 100 includes a center part 110 having an open structure and side parts 121 and 122 having a closed structure. The total width of the screen 110 is about 1,400 mm, the width of the center part 110 is about 300 mm, and each of the side parts 121 and 122 is about 550 mm. The hot air discharged from the hot air discharge unit is supplied to the electrode substrate through the opened center part 110 via the screen 100. Hence, it is possible to prevent a phenomenon that the side region in the width direction of the electrode substrate is dried prior to the center part 110.

The wind speed of the hot air, which is applied to each region of the electrode substrate corresponding to the screen 100 illustrated in FIG. 3, was measured. Specifically, the wind speed of the hot air was measured at the surface of each region of the electrode substrate corresponding to each of points (A-1) to (A-3) of FIG. 3. The airflow volume of the supplied hot air was indicated in RPM units, and the wind speed per measurement location was indicated in m/s units. Velocicalc 9565P of TSI company was used to measure the wind speed of the hot air. The results are shown in Table 1.

TABLE 1

| Airflow volume | Wind speed per measurement location (m/s) | | |
|---|---|---|---|
| (RPM) | (A-1) | (A-2) | (A-3) |
| 550 | 0.40 | 1.00 | 0.20 |
| 1,000 | 0.94 | 2.54 | 0.20 |
| 1,500 | 1.12 | 3.80 | 0.20 |

Referring to Table 1, at the condition of 1,000 RPM, the wind speed of the point corresponding to the center part is 0.94 m/s, which corresponds to about 4.7 times of 0.20 m/s which is the wind speed at the point corresponding to the side part.

Second Embodiment

FIG. 4 is a schematic diagram showing a screen according to another embodiment of the present invention. Referring to FIG. 4, a screen 200 includes a center part 210 having a partly opened structure, and two side parts 221 and 222 having a closed structure. Boundary parts 211 and 212 having a plurality of through holes are formed at two opposing sides of the center part 210. The total width of the screen 200 is about 1,400 mm, the width of the center part 210 is about 500 mm, and each of the side parts 221 and 222 is about 450 mm. Further, the width of the completely opened region of the center part 210 is 300 mm, and the width of each of the boundary parts 211 and 212, which have through holes and are partly opened, is about 100 mm. The hot air discharged from the hot air discharge unit is supplied to the electrode substrate through the center part 210 via the screen 200.

The wind speed of the hot air, which is applied to each region of the electrode substrate corresponding to the screen 200 illustrated in FIG. 4, was measured. Specifically, the wind speed of the hot air was measured at the surface of each region of the electrode substrate corresponding to each of points (B-1) to (B-3) of FIG. 4. The airflow volume of the supplied hot air was indicated in RPM units, and the wind speed per measurement location was indicated in m/s units. Velocicalc 9565P of TSI company was used to measure the wind speed of the hot air. The results are shown in Table 2.

TABLE 2

| Airflow volume | Wind speed per measurement location (m/s) | | |
|---|---|---|---|
| (RPM) | (B-1) | (B-2) | (B-3) |
| 550 | 1.13 | 0.59 | 0.20 |
| 1,000 | 1.90 | 0.66 | 0.29 |
| 1,500 | 3.10 | 1.10 | 0.63 |

Referring to Table 2, at the condition of 1,000 RPM, the wind speed of the point corresponding to the center part is 1.90 m/s, which corresponds to about 6.7 times of 0.29 m/s which is the wind speed at the point corresponding to the side part. When compared with the result of Table 1, the result of Table 2 shows that by forming a region having through holes in the side of the center part, the overall wind speed of hot air increased, and the wind speed difference between the center part and the side part also increased.

Third Embodiment

FIG. 5 is a schematic diagram showing a screen according to another embodiment of the present invention. Referring to FIG. 5, the screen 300 includes two side parts having through holes of a diameter smaller than that of through holes formed in the center part. The total width of the screen 300 is 1,400 mm. The diameter of the through holes formed in the center of the center part is about 12 mm, and the diameter of the through holes formed in the end of the side part is about 6 mm. In FIG. 5, the diameter of each of the through holes gradually decrease toward both side parts from the center of the center part.

The wind speed of the hot air, which is applied to each region of the electrode substrate corresponding to the screen illustrated in FIG. 5, was measured. Specifically, the wind speed of the hot air was measured at the surface of each region of the electrode substrate corresponding to each of points (C-1) to (C-7) of FIG. 5. The airflow volume of the supplied hot air was indicated in RPM units, and the wind speed per measurement location was indicated in m/s units. Velocicalc 9565P of TSI company was used to measure the wind speed of the hot air. The results are shown in Table 3.

TABLE 3

| Airflow volume | Wind speed per measurement location (m/s) | | | | | | |
|---|---|---|---|---|---|---|---|
| (RPM) | (C-1) | (C-2) | (C-3) | (C-4) | (C-5) | (C-6) | (C-7) |
| 550 | 0.30 | 0.36 | 0.33 | 0.46 | 0.48 | 0.52 | 0.57 |
| 1,000 | 0.73 | 0.83 | 1.06 | 1.20 | 0.84 | 1.32 | 1.60 |

In Table 3, (C-1) is a region where through holes of a 6 mm diameter are formed, (C-2) is a region where through holes of a 7 mm diameter are formed, (C-3) is a region where through holes of a 8 mm diameter are formed, (C-4) is a region where through holes of a 9 mm diameter are formed, (C-5) is a region where through holes of a 10.5 mm diameter are formed, (C-6) is a region where through holes of a 11 mm diameter are formed, and (C-7) is a region where through holes of a 12 mm diameter are formed.

Referring to Table 3, in the 1,000 RPM condition, the wind speed gradually increases in the direction of the point (C-7) corresponding to the center part from the point (C-1) corresponding to the side part. However, in the point (C-1), the wind speed decreases slightly, which may be due to the influence of an eddy inside the drying furnace.

Fourth Embodiment

FIGS. 6 and 7 are profiles obtained by measuring the surface temperature of an electrode substrate immediately after drying the electrode substrate after top-coating and back-coating the electrode substrate when the electrode substrate drying method according to one embodiment of the present invention is implemented.

Referring to FIG. 6, after performing the top-coating process of forming a mixture layer on one surface of an electrode substrate, the surface temperature of the electrode substrate was measured in the transverse direction (TD) at the point of time after performing the drying process by applying a screen illustrated in FIG. 4. In FIG. 6, the average temperature of the center part of the electrode substrate is about 28.5° C. In this regard, the average temperature of the left side part (DS) is 29.3° C., and the average temperature of the right side part (OS) is 30.2° C. In the electrode substrate of FIG. 6, the temperature difference between the center part and the side part is in the range of 0.8 to 1.7° C.

Further, referring to FIG. 7, after back-coating an electrode substrate, the surface temperature of the electrode substrate was measured in the transverse direction (TD) at the point of time after performing the drying process by applying a screen illustrated in FIG. 4. In FIG. 7, the temperature of the center part of the electrode substrate is about 45.1° C. In this regard, the average temperature of the left side part (DS) is 45.6° C., and the average temperature of the right side part (OS) is 45.9° C. In electrode substrate of FIG. 7, the temperature difference between the center part and the side part is equal to or less than 0.8° C.

Referring to FIGS. 6 and 7, when the drying scheme according to the present invention is implemented, the temperature in the width direction of the electrode substrate is controlled at a very uniform level.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

DESCRIPTION OF REFERENCE NUMERALS

100, 200, 300: screen
110, 210: center part
211, 212: boundary part
121, 131, 221, 222: side part
(A-1), (A-2), (A-3), (B-1), (B-2), (B-3), (C-1), (C-2), (C-3), (C-4), (C-5), (C-6), (C-7): hot air speed measurement point

The invention claimed is:

1. Equipment for drying an electrode substrate, the equipment comprising:

a drying furnace which dries an electrode substrate;

a hot air discharge unit including a nozzle configured to discharge hot air; and a screen positioned on a hot air discharge line of the hot air discharge unit, the screen configured to control the hot air discharged from the nozzle, wherein the screen comprises a center part and a side part on a basis of a length in a width direction of the electrode substrate and satisfies a first condition:

$$D_{center} > 1.3 \times D_{side},$$

wherein $D_{center}$ denotes an average opening ratio in a center part region on a basis of the length in the width direction of the electrode substrate, and wherein $D_{side}$ denotes an average opening ratio of side parts formed on opposing side surfaces of the center part, wherein the center part includes an open region defining an aperture and boundary regions which are formed on both sides of the open region and have a plurality of through holes smaller than the aperture, and wherein the side part has a closed structure.

2. The equipment of claim 1, wherein;

a formation ratio of the center part to the side parts is between 15 to 60 and 40 to 85, wherein the side parts are formed on both the opposing side surfaces of the center part and have a closed structure.

3. The equipment of claim 1, wherein;

a wind speed of the hot air applied to each region of the electrode substrate corresponding to the screen satisfies a second condition:

$$1.5 \leq (WS_{center})/(WS_{side}) \leq 10,$$

wherein $WS_{center}$ denotes a wind speed (m/s) of hot air applied to the electrode substrate corresponding to the center part region of the screen, and wherein $WS_{side}$ denotes an average wind speed (m/s) applied to the electrode substrate corresponding to a side part region of the screen.

4. The equipment of claim 1, wherein;

each of the center part and the side part has a plurality of through holes, and wherein each through hole formed in the center part and the side part satisfies a second condition:

$$4 \leq D1/D2 \leq 20,$$

wherein D1 denotes an average diameter of through holes formed in the center part, and wherein D2 denotes an average diameter of through holes formed on the side part.

5. The equipment of claim 4, wherein;

the average diameter D1 of the through holes formed in the center part is between 9 to 20 mm.

6. The equipment of claim 4, wherein;

the diameter of the through holes sequentially decreases in a direction toward the side part from the center part.

7. The equipment of claim 1, wherein;

the average opening ratio ($D_{center}$) of the center part is equal to or greater than 35%.

8. The equipment of claim 1, wherein;

the hot air discharge unit includes: an inlet through which hot air is supplied; and a blowing fan configured to blows hot air supplied through the inlet.

9. The equipment of claim 1, further comprising:

a temperature sensor configured to measures a surface temperature of a target electrode substrate.

10. The equipment of claim 1, wherein at least a portion of the boundary region is disposed between the side part and the center part.

11. The equipment of claim 1, wherein the center part and the side part are separated by the boundary regions.

12. The equipment of claim 1, wherein the aperture encompasses an entirety of the center part.

13. The equipment of claim 1, wherein the aperture of the center part extends between and is adjacent to the boundary regions formed on both sides of the open region.

14. A method for drying an electrode substrate, the method comprising:

drying an electrode substrate, which is transferred along a transfer line, by using the equipment according to claim 1.

15. The method of claim 14, wherein;

during the drying of the electrode substrate, the electrode substrate has a structure wherein a mixture layer is coated on a first surface of a current collector, and hot air is applied to a mixture-layer-coated surface of the current collector, or the electrode substrate has a structure wherein a mixture layer is coated on first and second opposing surfaces of the current collector, and hot air is applied to mixture-layer-coated surfaces of the current collector.

16. The method of claim 14, wherein the electrode substrate is an electrode substrate for a pouch-type secondary battery.

17. Equipment for drying an electrode substrate, the equipment comprising:

a drying furnace which dries an electrode substrate;

a hot air discharge unit including a nozzle configured to discharge hot air; and a screen positioned on a hot air discharge line of the hot air discharge unit, the screen configured to control the hot air discharged from the nozzle, wherein the screen comprises a center part and a side part on a basis of a length in a width direction of the electrode substrate and satisfies a first condition:

$$D_{center} > 1.3 \times D_{side},$$

wherein $D_{center}$ denotes an average opening ratio in a center part region on a basis of the length in the width direction of the electrode substrate, wherein $D_{side}$ denotes an average opening ratio of side parts formed on opposing side surfaces of the center part, and wherein a wind speed of the hot air applied to each region of the electrode substrate corresponding to the screen satisfies a second condition:

$$1.5 \leq (WS_{center})/(WS_{side}) \leq 10,$$

wherein $WS_{center}$ denotes a wind speed (m/s) of hot air applied to the electrode substrate corresponding to the center part region of the screen, wherein $WS_{side}$ denotes an average wind speed (m/s) applied to the electrode substrate corresponding to a side part region of the screen.

* * * * *